(12) United States Patent
Hulick

(10) Patent No.: US 7,257,557 B2
(45) Date of Patent: Aug. 14, 2007

(54) MULTI-MODAL TESTING METHODOLOGY

(75) Inventor: Alan Michael Hulick, Dallas, TX (US)

(73) Assignee: Online Testing Services, Inc., Frisco, TX (US)

( * ) Notice: Subject to any disclaimer, the term of this patent is extended or adjusted under 35 U.S.C. 154(b) by 194 days.

(21) Appl. No.: 10/894,761

(22) Filed: Jul. 20, 2004

(65) Prior Publication Data

US 2005/0086498 A1    Apr. 21, 2005

Related U.S. Application Data

(60) Provisional application No. 60/489,203, filed on Jul. 22, 2003.

(51) Int. Cl.
*G09B 5/14*    (2006.01)

(52) U.S. Cl. .......................... 705/50; 705/1; 434/353; 434/354; 380/2; 380/9

(58) Field of Classification Search .................. 705/50, 705/1; 434/322, 353, 354; 380/2, 9
See application file for complete search history.

(56) References Cited

U.S. PATENT DOCUMENTS

| | | | | |
|---|---|---|---|---|
| 5,565,316 | A | * | 10/1996 | Kershaw et al. ............ 434/322 |
| 5,827,070 | A | * | 10/1998 | Kershaw et al. ............ 434/322 |
| 5,947,747 | A | * | 9/1999 | Walker et al. ................ 705/50 |
| 6,112,049 | A | * | 8/2000 | Sonnenfeld ................. 434/322 |
| 2002/0165912 | A1 | * | 11/2002 | Wenocur et al. ............ 709/203 |

FOREIGN PATENT DOCUMENTS

JP    1041767    * 10/2000

OTHER PUBLICATIONS

Development of a Biometric Testing Protocol for Dynamic Signature Verifications, S.J. Elliot, Dec. 2002.*

\* cited by examiner

*Primary Examiner*—Andrew J. Fischer
*Assistant Examiner*—John Winter
(74) *Attorney, Agent, or Firm*—David W. Carstens; Carstens & Cahoon, LLP

(57) ABSTRACT

A method, program and system for administering tests in a distributed data processing network are provided by the present invention. The invention includes combining predetermined test content and multimedia support material into a single encrypted test file. The multimedia support may include visual and audio files for presenting test questions. The invention then exports the encrypted test file to at least one remote test location. The test locations import and decrypt the encrypted test file and load the test content and multimedia support material into a local database. The test is administered on a plurality of client workstations at the testing location, wherein the test may include audio questions and verbal responses by participants. During the course of testing biometric data about test participants is recorded and associated with the test files and participant identification. After the test is completed, the invention combines the completed test results, including verbal responses and biometric data, into a single encrypted results file and exports the encrypted results file to a remote evaluation location. The evaluation location imports and decrypts the encrypted results file and loads the test results into a local database for grading.

16 Claims, 7 Drawing Sheets

MULTI-MODAL TESTING METHODOLOGY

CROSS-REFERENCE TO RELATED APPLICATION

This application claims the benefit of and priority to a U.S. Provisional Patent Application No. 60/489,203 filed Jul. 22, 2003, the technical disclosure of which is hereby incorporated herein by reference.

BACKGROUND OF THE INVENTION

1. Technical Field

The present invention relates generally to online testing methods, and more specifically to a method of online testing that utilizes multiple means of data input and biometric verification.

2. Description of Related Art

Online testing is becoming an increasingly popular and convenient method for administering and processing tests. The decentralized structure and operation of the Internet provide tremendous flexibility concerning the time and location of test administration. In addition, because online tests are administered and processed electronically, they provide the added benefits of speed and timely results, particularly when test subjects are dispersed over a large geographical area.

The decentralized structure of the Internet also entails disadvantages as well. One disadvantage is difficulty in validating the identity of test subjects. Traditionally, usernames and pass phrases are used to verify user identity. However, such methods are typically employed for the purpose of preventing unwanted access to a user account. In the context of testing, there is the possibility that the test subject may indeed want to allow access by an unauthorized person in order to have someone else take the test.

Current testing systems have many weaknesses in their levels of data security, identity validation, and platform security. When an institution, such as a university, offers a course on-line, there is no definitive electronic or biometric way of proving the person who signed up for the course is actually taking the course online. In some cases, the person must travel to the university registrar's office for identity validation. However, in most cases, no identity validation other than basic student information is required.

Even if the institution in question requires identity validation for a student, once the student has left the campus, little data security is provided for the content. Students can view and copy course content once the content arrives on their thin client application or browser. If it's a medium or high stakes assessment, they can copy and print the contents of the test using standard industry browser technology. This puts a tremendous burden on the content-providing institution to maintain a large database of course content to avoid students from copying and distributing past assessments.

Therefore, it would be desirable to have a method and system for providing a means of using content data security and identity validation to allow content-providing institutions to reliably distribute content and verify student identification over an extended electronic network such as the Internet.

SUMMARY OF THE INVENTION

The present invention provides a method, program and system for administering tests in a distributed data processing network. The invention includes combining predetermined test content and multimedia support material into a single encrypted test file. The multimedia support may include visual and audio files for presenting test questions. The invention then exports the encrypted test file to at least one remote test location. The test locations import and decrypt the encrypted test file and load the test content and multimedia support material into a local database. The test is administered on a plurality of client workstations at the testing location, wherein the test may include audio questions and verbal responses by participants. During the course of testing biometric data about test participants is recorded and associated with the test files and participant identification. After the test is completed, the invention combines the completed test results, including verbal responses and biometric data, into a single encrypted results file and exports the encrypted results file to a remote evaluation location. The evaluation location imports and decrypts the encrypted results file and loads the test results into a local database for grading.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
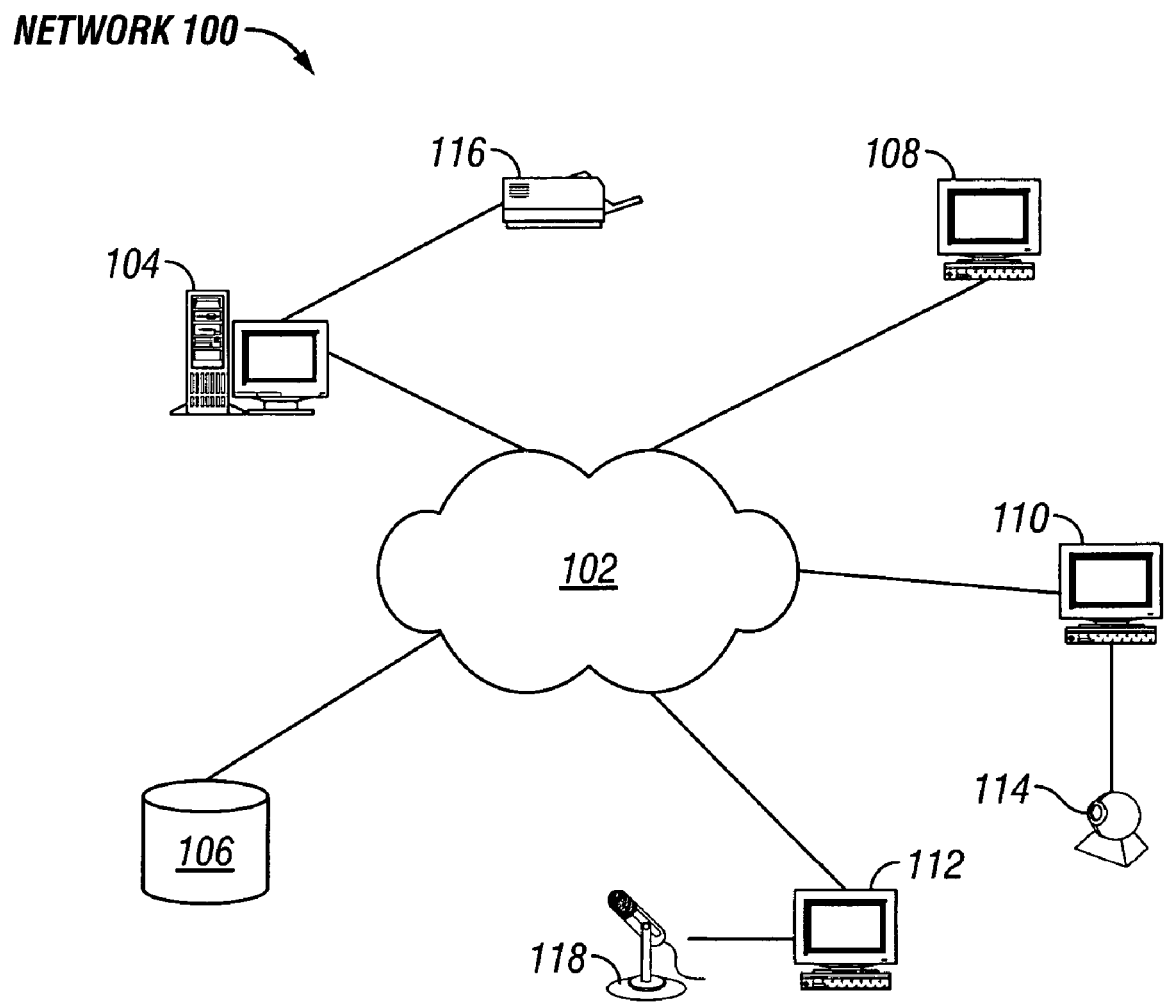
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 includes peripheral devices such as a camera 114, printer 116, and multimedia devices (microphone, headsets) 118. The network 100 may also include additional servers, clients, and other peripheral devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
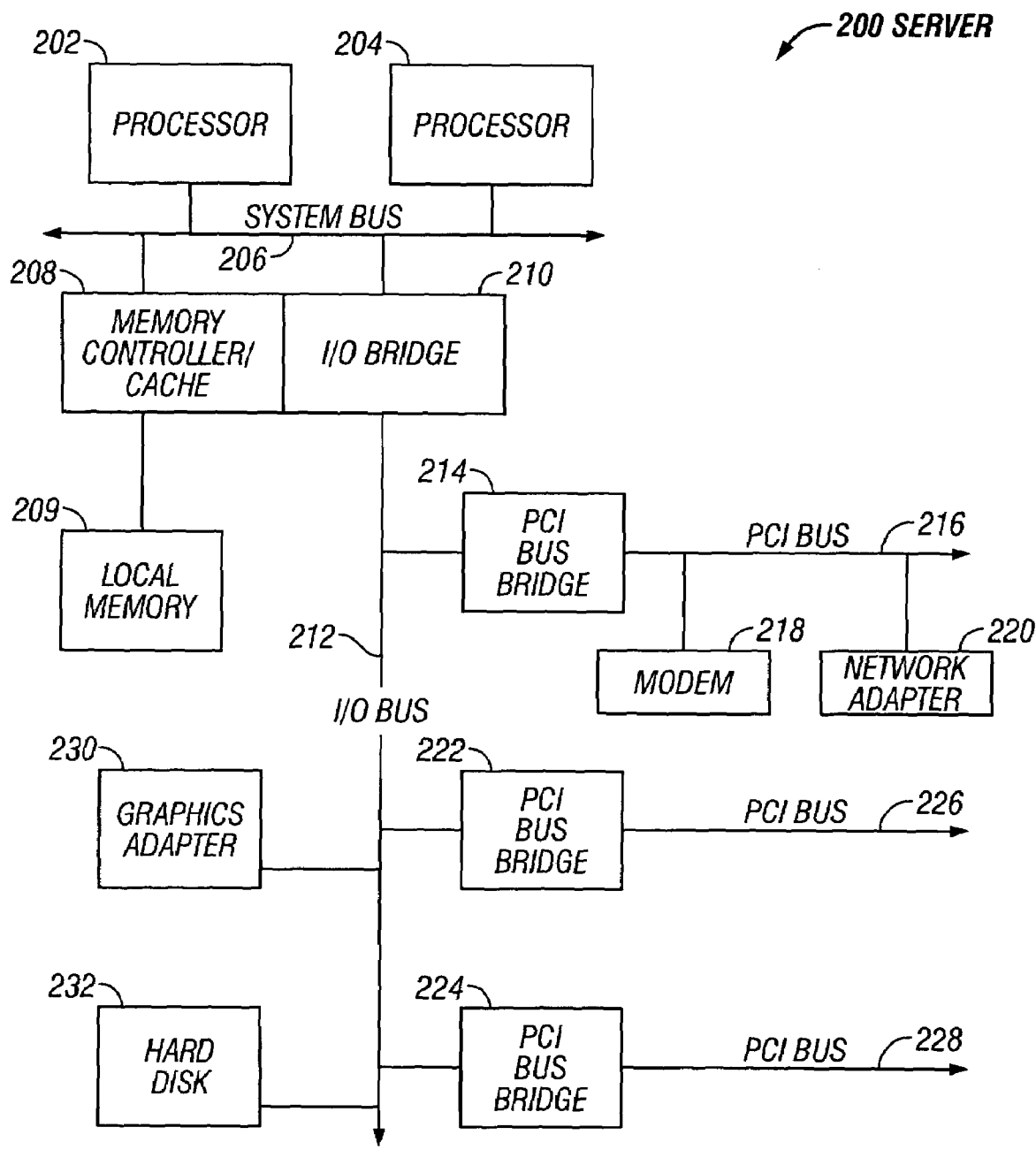
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
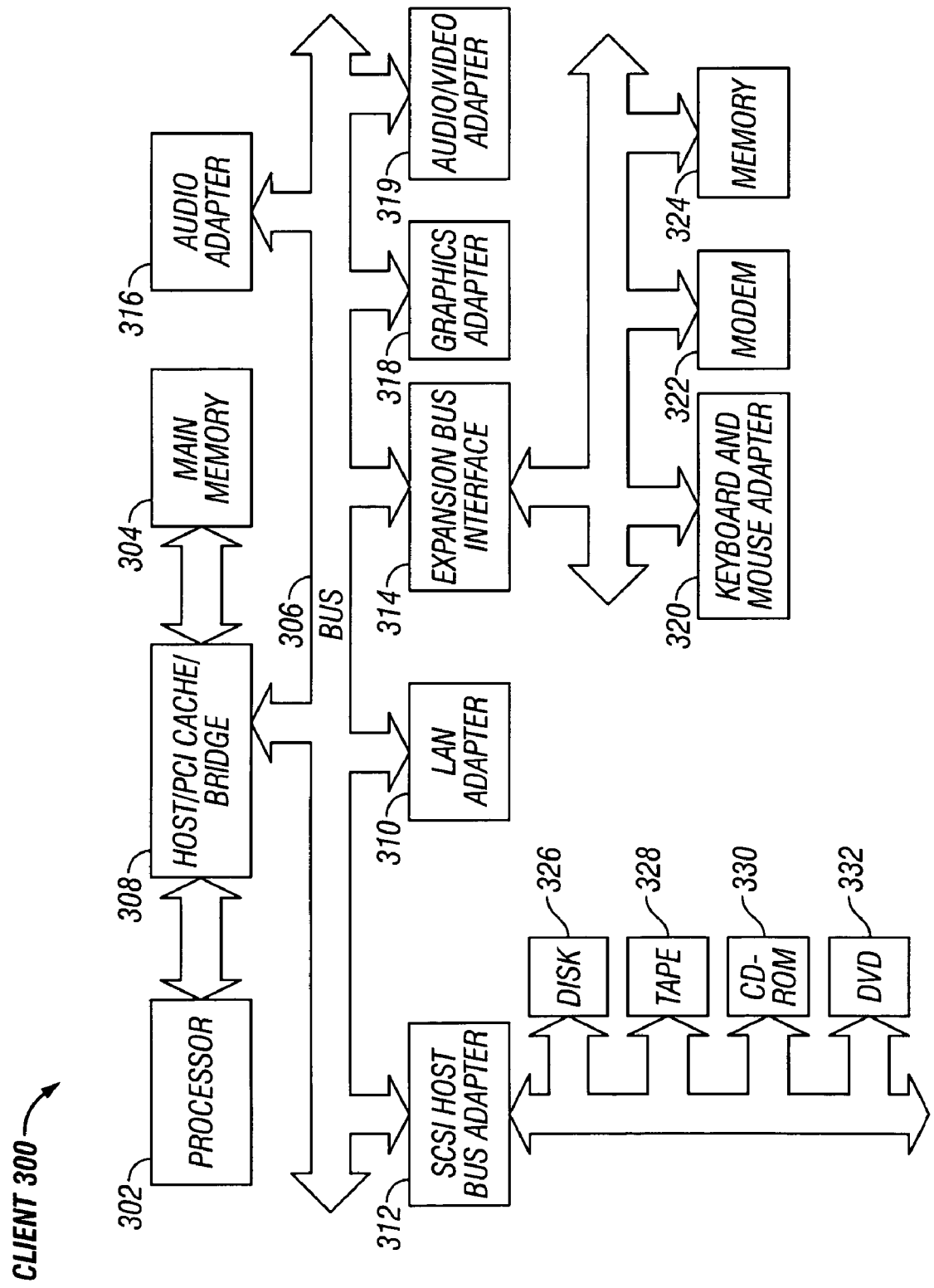
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drive and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
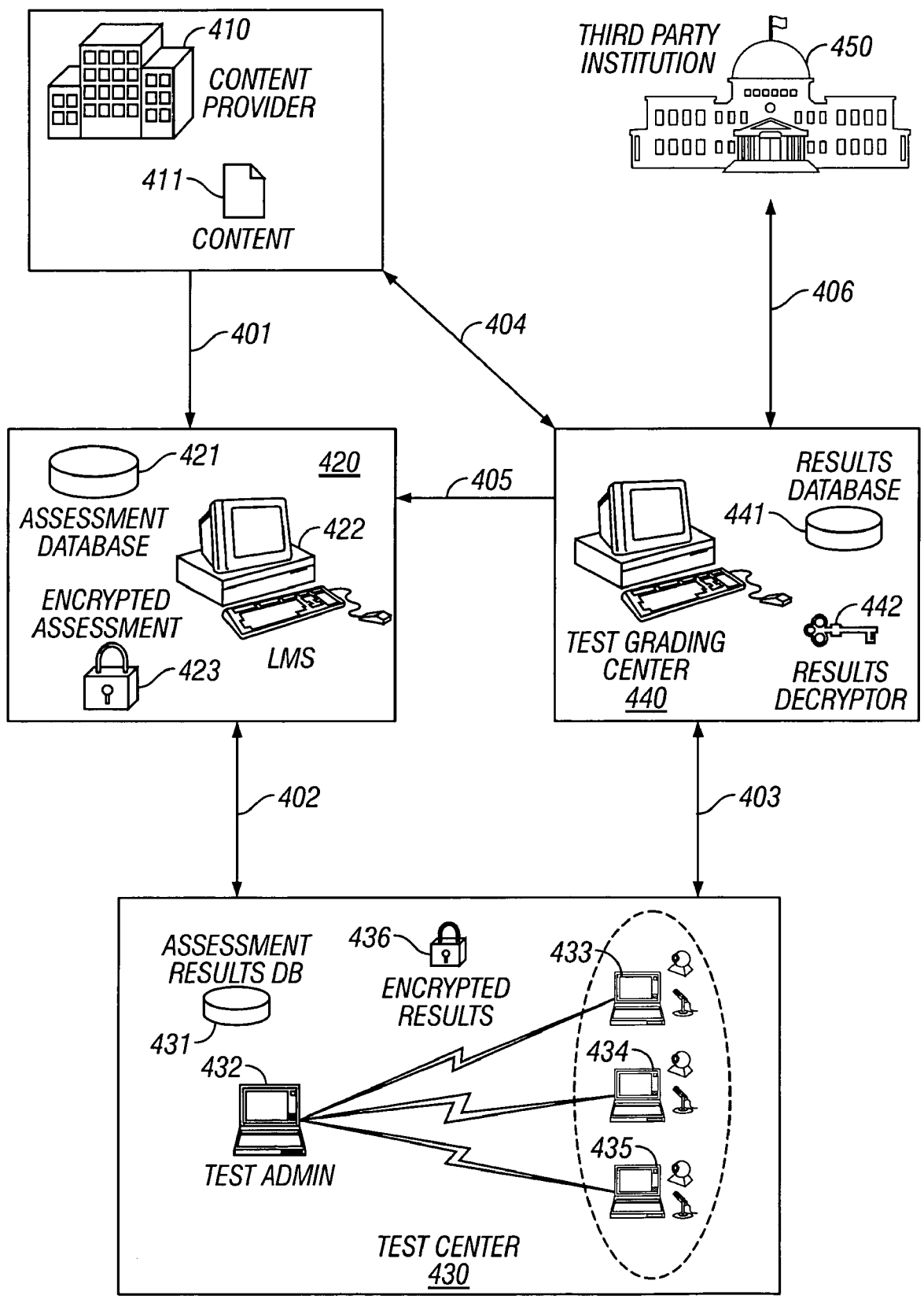
FIG. 4 is a structural overview of a secure test-taking network in which the present invention is implemented.

FIG. 4 is a structural overview of a secure test-taking network in which the present invention is implemented. Similar to traditional testing, the process begins with a content provider 410 that determines the actual questions and answers for the test in question. After the specific content of the test is finalized, an unformatted version 411 is uploaded via a secure network connection 401 to an online testing service 420.

The online testing service 420 provides dual locations for assessment (test) importation into an authoring and publishing Learning Management System (LMS) 422. Test contents are stored in an assessment database 421 and converted into the necessary electronic format by means of authoring software. When the electronic authoring and publishing is complete, the test is encrypted, ready to be exported for onsite testing.

The online testing service's software provides a means of extracting test data from the assessment database 421 and packaging the content into a secure data packet. It takes all of the test data, as well as supporting multimedia files (e.g., JPG's, flash animations, etc.) and encrypts them into a secure data packet 423. Once the data is encrypted, it is ready for distribution via secure link 402.

After a test center 430 receives the secure packet, the online testing service's software decrypts and unpacks the test data and populates a local assessment database 431. At this point the test resides in a protected database 431, ready for participants to take the test(s).

The test is then administered over a closed local area network that comprises multiple workstations, e.g., 433, 434, and 435. In one embodiment of the present invention, the testing scenario may include up to 100 workstations. During the assessment, participants are taking and answering questions using the LMS. The results are stored into the local assessment database 431 while testing continues. Also, because of enhancements to the LMS, biometric identification is occurring at random intervals and also being stored into the local database 431.

Once the participants have taken the test, the test administrator 432 runs the online testing service's software to export assessment results into an encrypted data packet. All of the answers, oral responses, and biometric identification data are packaged and secured for distribution, and the secured packet 436 is uploaded via secure network link 403 to a test-grading center 440.

A decrypting application 442 at the grading center 440 decrypts the results 436 and populates the results database 441 where they can be graded and evaluated. The assessment content providers 410 also have direct access to the test-grading center 440 via a secure link 404 and are responsible for providing assessment evaluation and generation. The encrypted results of the assessment are exported to the online testing service 420 via secure link 405, where the generic LMS 422 will give the graders the scores of the tests. Markers grade the tests. Occasionally, institutions outsource test grading, so the content providers may not be the same entity as the markers.

In addition to the assessment content provider 410, third party institutions 450 also have direct access to the test-grading center 440 via a secure link 406. Examples of third party institutions include schools, government agencies, and professional certifying organizations that rely on standardized testing.

Figure 5:
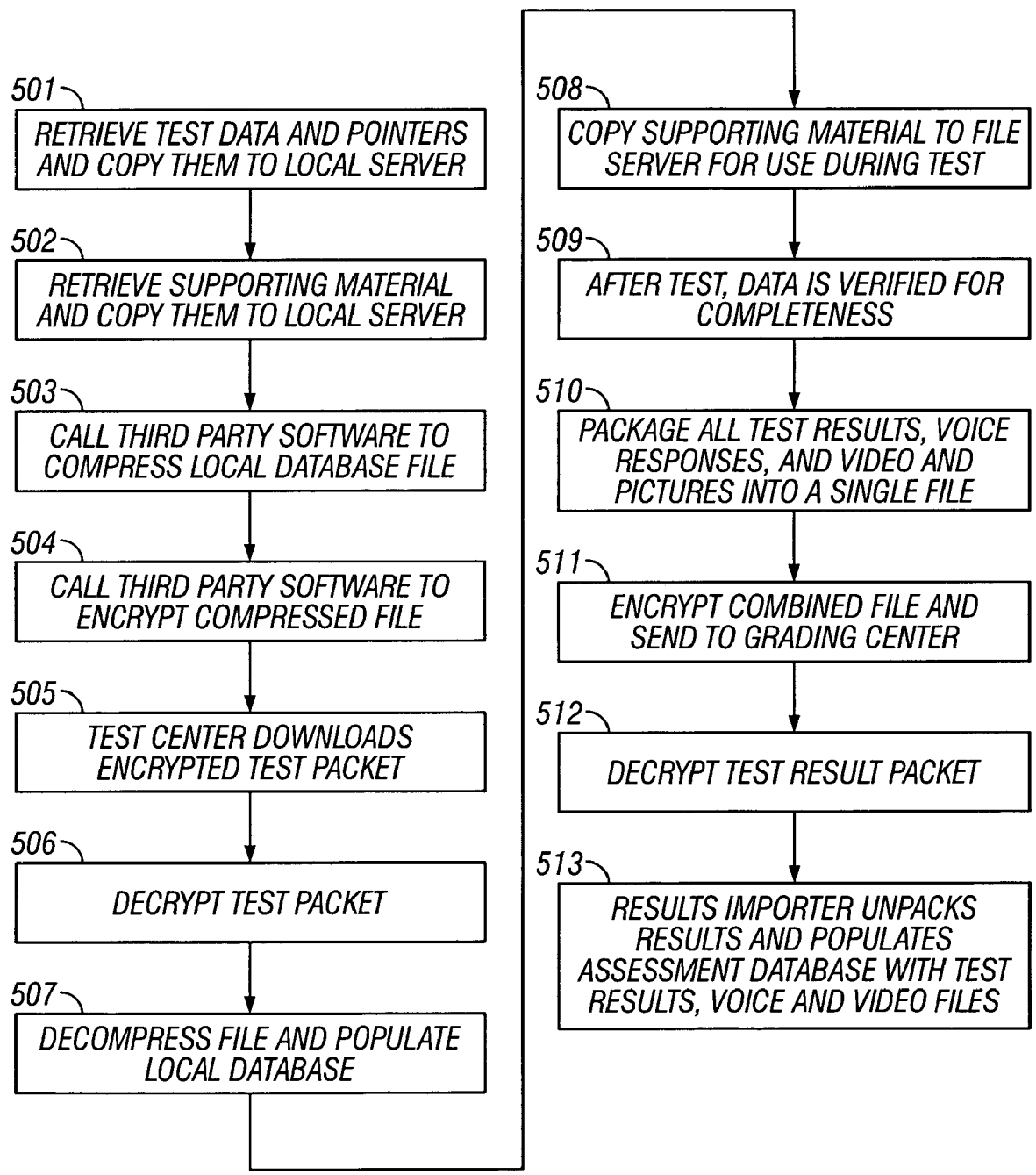
FIG. 5 is a flowchart illustrating the process of exporting and importing testing materials and results in accordance with the present invention.

FIG. 5 is a flowchart illustrating the process of exporting and importing testing materials and results in accordance with the present invention. The online testing service's software accomplishes the encryption and packaging of test data by using third party tools. The assessment database contains all test questions as well as pointers to multimedia files, Joint Photographic Experts Group (JPEG) files, and other supporting material. Participant information and schedules are also stored in the assessment database.

An assessment exporter retrieves all of the test data, participant IDs, and pointers to the supporting material from the assessment database and copies them to a database on a local server's hard drive (step 501). This local database is a file-based database in which all of the data is contained in a single file (e.g., Microsoft Access). Using the pointers from the assessment database, the assessment exporter then retrieves all of the multimedia supporting material from the assessment database and copies it to the local database (step 502). After all of the data and multimedia supporting materials are in the local database, the exporter makes function calls to third party software tools to perform data compression of the local database file (step 503). After the data and support material is compressed (packaged), the exporter makes a function call to third party tools to encrypt the data using industry standard encryption techniques (e.g. PGP, Blowfish algorithms) (step 504). Once the data is encrypted, it is ready for distribution.

The test center downloads the encrypted test packet (step 505), and an assessment importer decrypts the data packet (step 506), then decompresses the file and populates the local test center database (step 507). The assessment importer also copies the supporting materials to a file server for use during testing (step 508). The assessment exporter and importer use the same encryption/decryption technique to encrypt and decrypt the packet. The exporter has a private key (password) that only the importer knows. This private key is built into the applications so that the test administrators have no knowledge of the private key. Administrators simply use their own licensed assessment importers to import the data into their local databases automatically.

The test participants take the test, during which biometric data is recorded, and after each participant finishes the test, the data results are verified for completeness (step 509). A results exporter then retrieves all of the test results data, voice response, video and pictures and packages them into a single file (step 510). The results exporter encrypts this combined file and sends it to a test-grading center (step 511).

A results importer at the grading center decrypts the encrypted test results packet (step 512) and populates the results database with the results from the tests, along with the voice files and video/pictures files (step 513). The assessment database and results database are one and the same.

The present invention uses two installation CD's. A server installation CD contains all of the software required for the server and sets up the required framework for delivering the tests: LMS, Java/Video/Biometrics applications, and assessment importer/results exporter. This CD also installs the database required by the LMS. However, the server installation CD does not contain any test content.

The present invention enhances the LMS by including security features during the installation of the LMS and database to prevent tampering from the test center. These security features include disabling the system account for Structured Query Language (SQL) Server and setting up a password-protected account that only the LMS knows. The CD also installs the assessment importer and results exporter in such a way that only that particular server can run these applications. The importer/exporter checks if the IP addresses and server names (provided by the test centers in advance) match a list of authorized test centers. If the IP addresses do not match, the applications will not run, and the encrypted packet will not be imported. This prevents the test centers from using the applications on unauthorized machines.

The second CD is the client installation CD, which contains a Java Virtual Machine (JVM), Secure Browser application, and JavaSonics Java run time engine. The JVM is installed just in case the client machine does not have Java installed (required by the Java Voice File application). The secure browser is an application provided by the LMS or other third party software vendors and prevents test participants from copying, printing, or altering the test in any way. The browser points only to the test server and cannot be changed to point to any other server, so it is only good for that particular server with that particular IP address. The secure browser prevents test participants from right-clicking the mouse to view the source code, and depending on the nature of the test, it may also prevent participants from hitting the backspace key to navigate to previous questions (thereby getting a second chance to answer test questions). The JavaSonics java run time engine is required on each client machine in order to use the Java Voice File recording application. It is a one-time installation.

Figure 6:
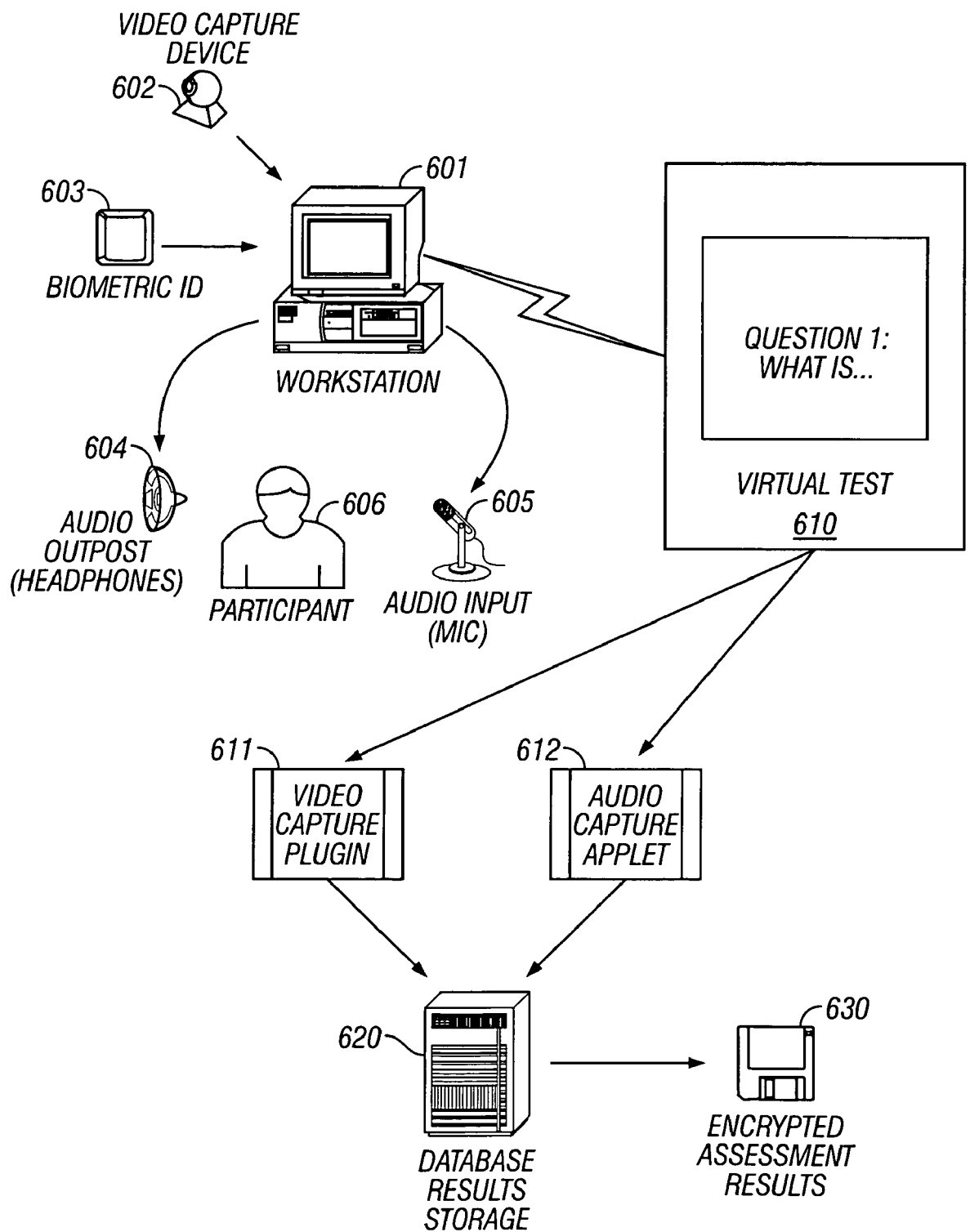
FIG. 6 illustrates a testing workstation and its interaction with the testing database in accordance with the present invention.

FIG. 6 illustrates a testing workstation and its interaction with the testing database in accordance with the present invention. The workstation 601 utilizes a multitude of data input modes for administering the test as well as collecting biometric data to verify the identity of the test participant 606. In addition to input through a standard keyboard and computer mouse, the present invention also supports an audio testing format. The participant 606 hears auditory questions via headphones or speakers 604 and replies by giving a verbal response via a microphone 605. A Java audio capture applet 612 is incorporated into each question 610 that requires a verbal response. This voice applet 612 records the participant's responses and uploads the audio file to the web server 620.

In addition to audio input and output, the present invention also uses a video capture unit 602 to monitor the participant 606. Video data from the video capture unit 602 is compared to a stored biometric ID file 603 that is associated with the person that is supposed to be taking the test. Biometric identification supports positive identity recognition by administering authorities and prevents unauthorized persons from taking the test in place of the proper participants scheduled to take the test. Examples of other biometric identification methods that may be used include fingerprint, retinal scans, and voice pattern identification. Biometrics is a growing field and any of the standard methods known in the art may be applied to the present invention alone or in combination.

The video capture unit 602 does not necessarily have to operate continuously. In a preferred embodiment of the present invention, video capture plugins 611 are randomly incorporated into the questions 610. After capturing still frames from the video capture unit 602, the plugin 611 uploads the picture to the web server 620.

Each participant 606 has a globally unique ID, allowing video and voice files to be uniquely associated with that participant. Along with the data from the test results, voice and video files are stored as pointers in the database 620 that point to the actual voice and video files. After the test is complete, the results and identification data are encrypted for export, and the encrypted file 630 is sent to a grading and evaluation center, as explained above.

Figure 7:
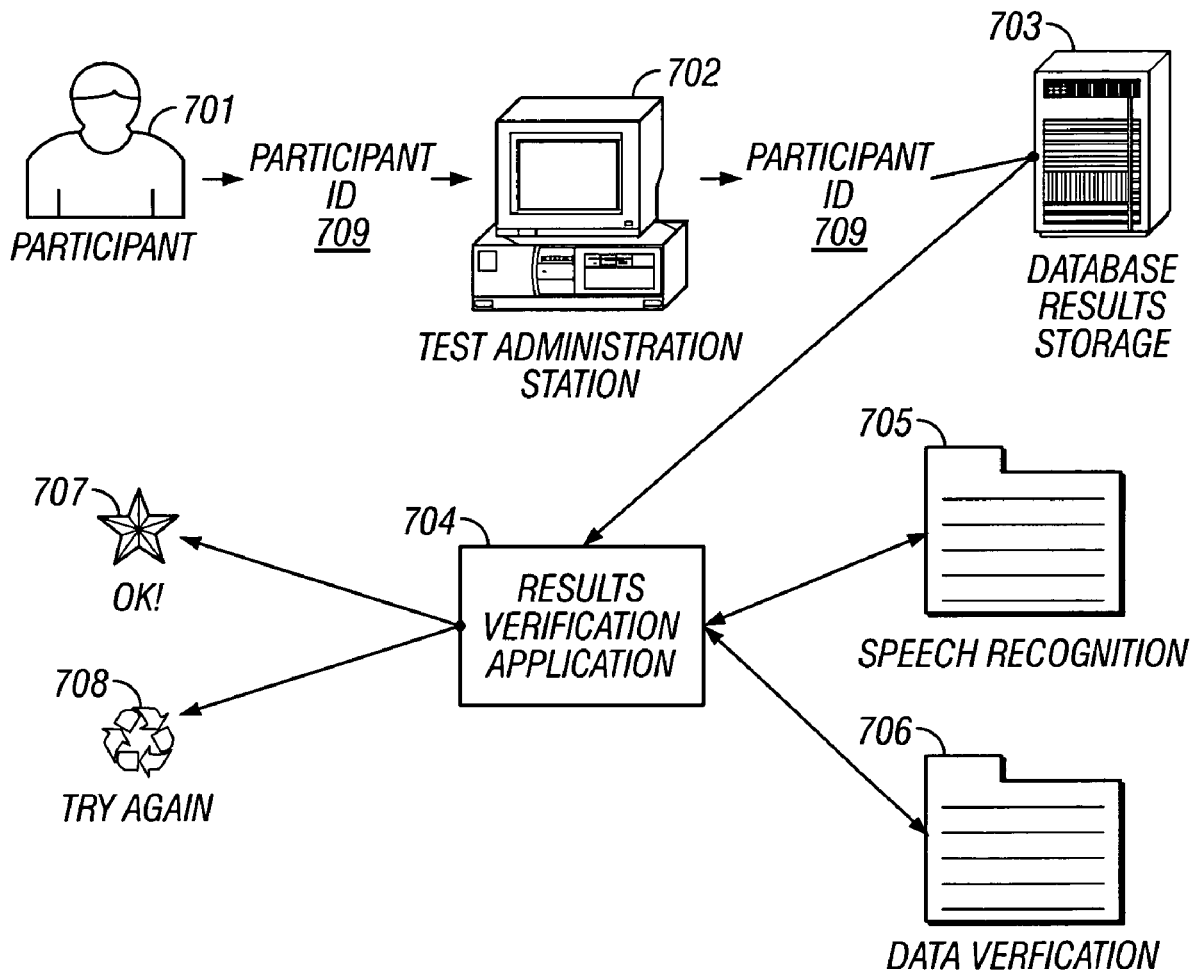
FIG. 7 illustrates the process of test data verification in accordance with the present invention.

FIG. 7 illustrates the process of test data verification in accordance with the present invention. Data verification is performed after the participant 701 has finished the test in question. Verification is done only to ensure the data is complete, not for grading purposes. For example, if for some reason the voice responses were all empty (due to a malfunctioning microphone, etc.) the test administrator can take alternative action to ensure the participant gets a fair chance to take the test. Since retesting participants poses considerable logistical problems, immediate verification of test completeness avoids having to retest the participants later due to technical malfunctions.

Since the participant ID 709 is linked to each question and answer, only the ID is sent to the test administration station 702 to verify the test results. The test administrator 702 inputs the participant ID 709 into a results verification application 704, which is stored on the test servetest server 703.

Verbal responses are evaluated using speech recognition technology 705 to check for completeness. Speech recognition technology 705 can recognize spoken language. If a technical malfunction exists, the speech recognition can alert the test administrator. Data verification 706 is performed at the time of exportation to ensure the data is free of corruption. If there are no problems with the data completeness or integrity, the verification application 704 returns a positive signal 707 to the administrator. If there are problems with either completeness or data corruption, the administrator is alerted to try again 708.

Test center administrators may or may not take action if the test results are incomplete. If the test administrators have the facilities to re-test an individual, then they can re-test the individual on the spot. If not, they can immediately rescheduled the participant to re-take the test.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

I claim:

1. A method for securing the administration of testing in a distributed data processing network, the method comprising the computer implemented steps of:
    (a) combining test content and multimedia support material into a single encrypted test file;
    (b) exporting the encrypted test file to at least one remote test location server;
    (c) importing and decrypting the encrypted test file at the test location server, wherein decryption of the test file is performed automatically by importation software with a built in password, wherein test administrators at the testing location have no knowledge of the password, wherein the test location imports the encrypted test file only if its Internet Protocol address and server name match a list of authorized test locations;
    (d) loading a secure browser onto at least one client workstation at the test location, wherein said secure browser points only to the test location server and cannot be changed to point to any other server, and wherein said secure browser prevents test participants from copying, printing, or altering the test;
    (e) using said secure browser to administer the test on said client workstation, wherein the test may include verbal responses by test participants;

(f) recording biometric data about each test participant during testing;

(g) combining completed test results, including verbal responses and biometric data, into a single encrypted results file; and (h) exporting the encrypted results file to a remote evaluation location for grading.

2. The method according to claim 1, further comprising: loading the test content and multimedia support material into a local database at the test location, and wherein test answer data and biometric data are stored in said local database.

3. The method according to claim 1, further comprising: verifying the test data for each participant to ensure the data is complete and free of corruption before grading the test.

4. The method according to claim 1, wherein the identity of each participant is verified by comparing the biometric data recorded during testing to a stored biometric ID file associated with each participant scheduled to take the test.

5. The method according to claim 4, wherein the biometric data may include at least one of the following:

video capture;

fingerprints;

retinal scan; and voice pattern identification.

6. The method according to claim 1, wherein third parties may directly access test results at the evaluation location.

7. The method according to claim 1, wherein the secure browser prevents test participants from right-clicking a mouse to view the source code.

8. The method according to claim 1, wherein secure browser prevents test participants from hitting the backspace key to navigate to previous questions.

9. A system for securing the administration of testing in a distributed data processing network, the system comprising:

(a) test exportation software for combining test content and multimedia support material into a single encrypted test file;

(b) a first secure communication link for exporting the encrypted test file to at least one remote test location server;

(c) a test importer for importing and decrypting the encrypted test file at the test location server, wherein decryption of the test file is performed automatically by importation software with a built in password, wherein test administrators at the testing location have no knowledge of the password, wherein the test location imports the encrypted test file only if its Internet Protocol address and server name match a list of authorized test locations;

(d) at least one client for administering the test at the test location, wherein the test may include verbal responses by test participants;

(e) a secure browser on said client, wherein said secure browser points only to the test location server and cannot be changed to point to any other server, and wherein said secure browser prevents test participants from copying, printing, or altering the test;

(f) at least one biometric sensor for recording biometric data about each test participant during testing;

(g) a results exporter for combining completed test results, including verbal responses and biometric data, into a single encrypted results file; and (h) a second secure communication link for exporting the encrypted results file to a remote evaluation location for grading.

10. The system according to claim 9, further comprising:

a local database at the test location into which the importation software loads the test content and multimedia support material, and wherein test answer data and biometric data are stored in said local database.

11. The system according to claim 9, further comprising:

a data verification mechanism for verifying the test data for each participant to ensure the data is complete and free of corruption before grading the test.

12. The system according to claim 9, wherein the identity of each participant is verified by comparing the biometric data recorded during testing to a stored biometric ID file associated with each participant scheduled to take the test.

13. The system according to claim 12, wherein the biometric data may include at least one of the following:

video capture;

fingerprints;

retinal scan; and voice pattern identification.

14. The system according to claim 9, wherein third parties may directly access test results at the evaluation location.

15. The system according to claim 9, wherein the secure browser prevents test participants from right-clicking a mouse to view the source code.

16. The system according to claim 9, wherein secure browser prevents test participants from hitting the backspace key to navigate to previous questions.

* * * * *

UNITED STATES PATENT AND TRADEMARK OFFICE
CERTIFICATE OF CORRECTION

PATENT NO. : 7,257,557 B2 Page 1 of 1
APPLICATION NO. : 10/894761
DATED : August 14, 2007
INVENTOR(S) : Alan Michael Hulick It is certified that error appears in the above-identified patent and that said Letters Patent is hereby corrected as shown below:

In the Specification:
Column 8, line 14, please delete "servetest."

Signed and Sealed this

Twentieth Day of May, 2008

JON W. DUDAS
*Director of the United States Patent and Trademark Office*